(12) United States Patent
Okimura et al.

(10) Patent No.: US 7,322,451 B2
(45) Date of Patent: Jan. 29, 2008

(54) FRICTION DAMPER

(75) Inventors: Akihiko Okimura, Ashikaga (JP);
Kazuhiro Nagashima, Ashikaga (JP);
Go Tanaka, Ashikaga (JP); Yoshikazu Arai, Zushi (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 10/501,473

(22) PCT Filed: Jan. 15, 2003

(86) PCT No.: PCT/JP03/00256

§ 371 (c)(1),
(2), (4) Date: Jul. 14, 2004

(87) PCT Pub. No.: WO03/060344

PCT Pub. Date: Jul. 24, 2003

(65) Prior Publication Data

US 2005/0087414 A1    Apr. 28, 2005

(30) Foreign Application Priority Data

Jan. 16, 2002 (JP) ............................. 2002-007740
Dec. 26, 2002 (JP) ............................. 2002-376892

(51) Int. Cl.
*F16F 11/00* (2006.01)
(52) U.S. Cl. ........................................ 188/381; 188/67
(58) Field of Classification Search ................ 188/381, 188/67; 52/167.3, 167.9
See application file for complete search history.

(56) References Cited

U.S. PATENT DOCUMENTS 2,562,595 A * 7/1951 Blue .......................... 267/134
3,033,623 A    5/1962 Thomson
3,819,014 A * 6/1974 Mortensen ................... 188/381
4,559,248 A   12/1985 Sumiyoshi et al.
4,846,590 A    7/1989 Teramachi (Continued)

FOREIGN PATENT DOCUMENTS

GB           795689          5/1958

(Continued)

OTHER PUBLICATIONS

Supplemental European Search Report for EP 03700562, mailed Nov. 11, 2005, 2 pages.

(Continued)

*Primary Examiner*—Bradley King
(74) *Attorney, Agent, or Firm*—Nixon & Vanderhye P.C.

(57) ABSTRACT

A friction damper includes a base body; a support secured to an elongated member of the base body and having a through hole; a rod which extends in such a manner as to pass through the through hole of the support and is movable in an axial direction with respect to the support; a friction member which has a hollow cylindrical portion interposed between the support and a main body portion of the rod in the through hole of the support, and which is fixed immovably with respect to the relative movement of the rod in the axial direction with respect to the base body; and a tightening structure provided for the support so as to tighten the hollow cylindrical portion of the friction member onto the main body portion of the rod.

9 Claims, 8 Drawing Sheets

U.S. PATENT DOCUMENTS

| | | | | |
|---|---|---|---|---|
| 4,901,829 A | * | 2/1990 | East et al. | 188/381 |
| 5,229,198 A | * | 7/1993 | Schroeder | 442/7 |
| 5,560,162 A | | 10/1996 | Tekton | |
| 6,085,472 A | | 7/2000 | Malhotra | |
| 6,293,573 B1 | | 9/2001 | Olde-Heuvel et al. | |
| 6,548,188 B1 | * | 4/2003 | Yanase et al. | 428/626 |

FOREIGN PATENT DOCUMENTS

| | | |
|---|---|---|
| JP | 64-79417 | 3/1989 |
| JP | 05-106671 | 4/1993 |
| JP | 05-141466 | 6/1993 |
| JP | 05-248468 | 9/1993 |
| JP | 06-101731 | 4/1994 |
| JP | 09-189331 | 7/1997 |
| JP | 10-500468 | 1/1998 |
| JP | 2000-319472 * | 11/2000 |
| SU | 1341410 A1 | 9/1987 |

OTHER PUBLICATIONS

Microfilm of the specification and drawings annexed to the request of Japanese Utility Model Application No. 48370/1984 (Laid-open No. 159250/1985) (Kayaba Kogyo Kabushiki Kaisha) Oct. 23, 1985, Full text Family: none).

* cited by examiner

F I G. 14
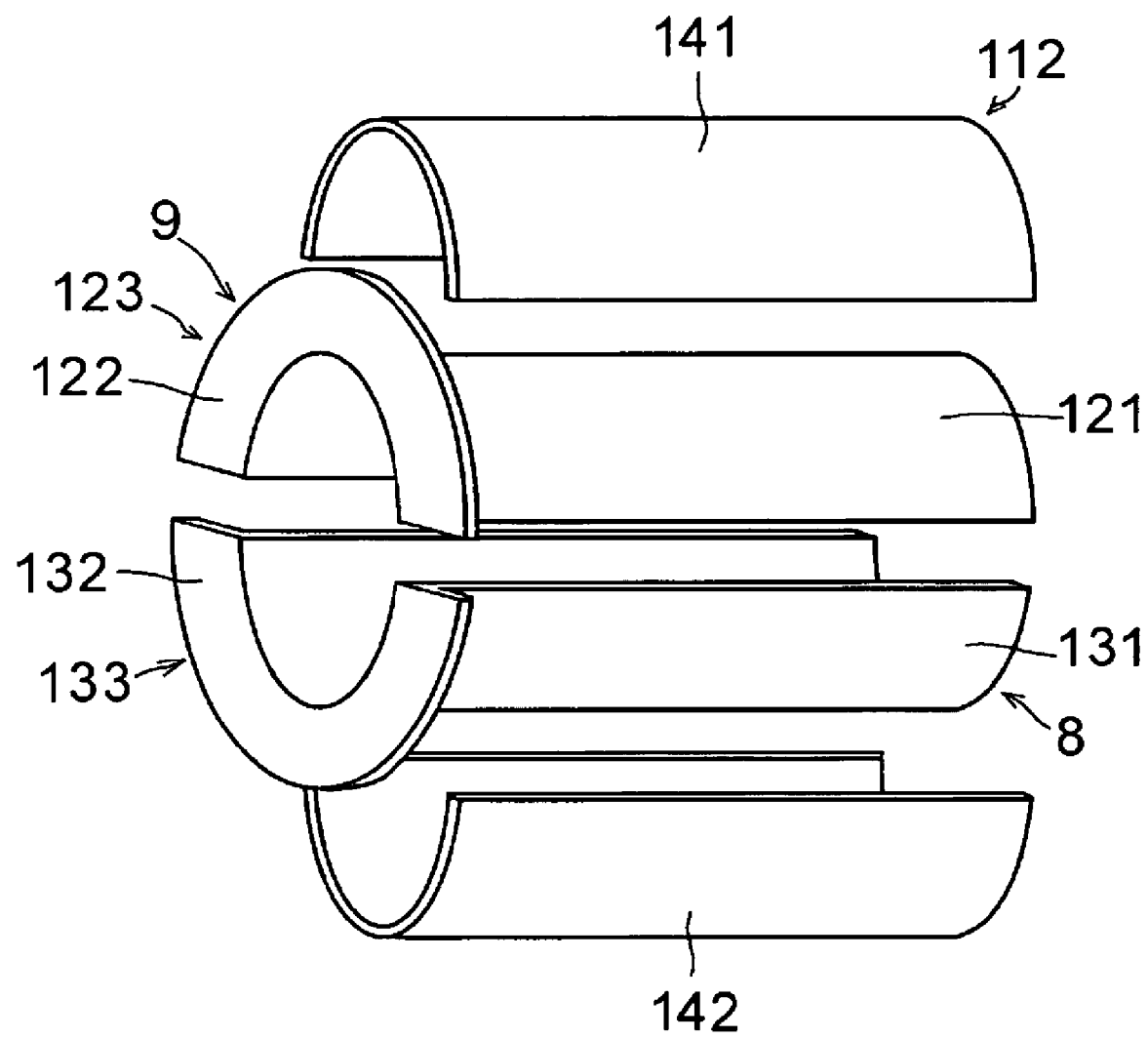

FRICTION DAMPER

This application is the US national phase of international application PCT/JP03/00256 filed in Japanese on 15 Jan. 2003, which designated the U.S. PCT/JP03/00256 claims priority to JP Application No. 2002-7740 filed 16 Jan. 2002 and JP Application No. 2002-376892 filed 26 Dec. 2002. The entire contents of these applications are incorporated herein by reference.

TECHNICAL FIELD

The present invention relates to a friction damper which is installed between a pair of members that are displaced relative to each other and which dampens displacement as speedily as possible by absorbing the displacement energy between the members through friction. More particularly, the present invention concerns a friction damper which dampens displacement as speedily as possible by absorbing the displacement energy occurring in structures such as office buildings, multiple dwelling houses, detached houses, bridges, and the like due to earthquakes or the like.

BACKGROUND ART

As dampers for speedily damping vibrations such as lateral shaking occurring in a structure due to an earthquake or the like, those using the viscous deformation of a viscous material, those using the plastic deformation of lead, steel rods, or the like, and those using the friction of a sliding member, among others, are known.

In the damper using a viscous material, much time is required in the charging operation of the viscous material, and it is necessary to provide a tight seal for preventing the leakage. In the damper using lead, a steel rods, or the like, there is a risk of environmental contamination due to lead, and it is required to firmly hold both ends of lead, the steel rod, or the like, respectively, to a pair of members which are displaced relative to each other.

Meanwhile, In the damper using a sliding member, there is a possibility of deterioration in characteristics due to the wear of the sliding member. Further, a sliding layer of the sliding member can peel off, which can also possibly cause deterioration in characteristics.

The present invention has been devised in view of the above-described aspects, and its object is to provide a friction damper which has a simple structure, is capable of reducing wear and the exfoliation of the sliding layer as practically as possible, and makes it possible to obtain stable damping characteristics over a long period of time.

DISCLOSURE OF THE INVENTION

The friction damper in accordance with a first aspect of the invention comprising: a base body adapted to be capable of being attached to one of a pair of members which are displaced relative to each other; a support secured to the base body and having a through hole; a rod which extends through the through hole of the support, is movable in an axial direction with respect to the support, and is adapted to be capable of being attached to another one of the pair of members; and a friction member which has a hollow cylindrical portion interposed between the support and the rod in the through hole of the support, and is fixed immovably with respect to the relative movement of the rod in the axial direction with respect to the base body, the hollow cylindrical portion of the friction member having a mesh-like base material disposed on a radially outer peripheral surface side thereof and a synthetic resin-made sliding layer filling meshes of the base material and formed on one surface of the base material, and the sliding layer being disposed on radially inner peripheral surface side of the hollow cylindrical portion so as to be brought into contact with the rod slidably in the axial direction.

In accordance with the friction damper according to the first aspect, the base material of the friction member is a mesh-like material, the sliding layer of the friction member is formed on one surface of the base material in such a manner as to fill the meshes of the base material, and such a sliding layer is disposed on the radially inner peripheral surface side of the hollow cylindrical portion so as to be brought into contact with the rod slidably in its axial direction. Therefore, it is possible to avoid wear with respect to the rod as practically as possible, and obtain stable friction. Furthermore, it is possible to avoid the exfoliation of the sliding layer. Hence, it is possible to obtain stable damping characteristics over a long period of time.

The friction damper according to a second aspect of the invention, in the friction damper according to the first aspect, further comprises: tightening means for tightening the hollow cylindrical portion of the friction member against the rod. Here, the through hole of the support and the hollow cylindrical portion of the friction member is reducible in diameter, and the tightening means is adapted to reduce the diameter of the hollow cylindrical portion of the friction member through the reduction in diameter of the through hole of the support to tighten the hollow cylindrical portion against the rod.

In accordance with the friction damper according to the second aspect, the hollow cylindrical portion of the friction member can be tightened onto the rod by the tightening means by being optimally adjusted. Therefore, by a simple operation, optimal frictional resistance can be obtained for the pair of members which undergo relative displacement.

As in the friction damper according to a third aspect of the invention, the support preferably has a slit communicating with the through hole and is thereby reducible in diameter. In this case, as in the friction damper according to a fourth aspect of the invention, the tightening means preferably has a bolt threadedly engaged with the support, so as to be able to reduce the width of the slit.

In addition, as in the friction damper according to a fifth aspect of the invention, the support is preferably formed into two-split members and is thereby reducible in diameter. In this case, as in the friction damper according to a sixth aspect of the invention, the tightening means preferably has a bolt threadedly engaged with the support, so as to be able to reduce the width of a gap between the two-split members.

The hollow cylindrical portion of the friction member in a preferred example has a slit extending from one end face to another end face thereof in the axial direction, and is thereby reducible in diameter as in the friction damper according to a seventh aspect of the invention, or is formed into two-split members and is thereby reducible in diameter as in the friction damper according to an eighth aspect of the invention.

In the invention, as in the friction damper according to a ninth aspect of the invention, in addition to the hollow cylindrical portion, the friction member preferably has a collar formed integrally with the hollow cylindrical portion, and is fixed immovably with respect to the relative movement of the rod in the axial direction with respect to the base body at the collar.

It should be noted that an annular groove may be formed in the inner peripheral surface of the support in the through hole of the support secured to the base body, and the friction member may be fitted to this annular groove, whereby, instead of or in conjunction with the above-described arrangement, the friction member may be fixed immovably with respect to the relative movement of the rod in the axial direction with respect to the base body.

In accordance with the friction damper according to a 10th aspect of the invention, in the friction damper according to any one of the second to ninth aspects, a plurality of supports arranged in the axial direction are provided, and the tightening means and the friction member are provided for each of the supports.

In accordance with the friction damper according to the 10th aspect, displacement energy is adapted to be absorbed by the plurality of friction members. Therefore, as a result of the fact that the loads of the respective friction members can be reduced, it is possible to obtain stable damping characteristics over a long period of time.

The friction damper in accordance with the invention is not limited to the one having a plurality of such supports and friction members, and the friction damper may have a single elongated support and a single elongated friction member. In this case, an arrangement may be provided such that the elongated hollow cylindrical portion of the single friction member is tightened against the rod by the tightening means consisting of a plurality of bolts and the like by means of the single elongated support.

In accordance with the friction damper according to an 11th aspect of the invention, in the friction damper according to any one of the second to eighth aspects, a plurality of supports arranged in the axial direction are provided, and the tightening means and the friction member are provided for each of the supports, and, in addition to the hollow cylindrical portion, each of the friction members has a collar formed integrally with the hollow cylindrical portion, and is fixed immovably with respect to the relative movement of the rod in the axial direction with respect to the base body by being clamped by the supports adjoining at the collar.

In accordance with the friction damper according to the 11th aspect of the invention, in the same way as the friction damper according to the 10th aspect, displacement energy is adapted to be absorbed by the plurality of friction members. Therefore, as a result of the fact that the loads of the respective friction members can be reduced, it is possible to obtain stable damping characteristics over a long period of time. Furthermore, the respective friction members are fixed immovably with respect to the relative movement of the rod in the axial direction with respect to the base body by being clamped by the supports adjoining at the collars. Therefore, the respective friction members can be firmly fixed, so that it is possible to eliminate the drawback that the friction members are offset from the supports.

As in the friction damper according to a 12th aspect of the invention, the base material preferably comprises one of an expanded metal and a metal wire net. The expanded metal is formed such that a multiplicity of slits are cut in a metal sheet, preferably a metal sheet made of phosphor bronze, and the metal sheet made of phosphor bronze with the multiplicity of slits cut therein is drawn in a direction perpendicular to the slit direction. The metal wire net is formed by weaving or knitting by using one or two or more fine metal wires comprising a stainless steel wire, such as austenitic SUS 304 and SUS 316 or ferritic SUS 430, an iron wire (JIS-G-3532), a zinc-plated iron wire (JIS-G-3547), a copper-nickel alloy (cupronickel) wire, a copper-nickel-zinc alloy (nickel silver) wire, a brass wire, a beryllium-copper wire, or the like.

The sliding layer preferably contains polyimide resin as in the friction damper according to a 13th aspect of the invention, or contains tetrafluoroethylene resin as in the friction damper according to a 14th aspect of the invention.

In accordance with the friction damper according to a 15th aspect of the invention, in the friction damper according to any one of the first to 14th aspects, the base body includes a tubular body; one cover secured to one end portion of the tubular body and having a through hole through which the rod is passed; and another cover secured to another end portion of the tubular body and having a fitting attached thereto for being attached to the one member. Here, the support being secured to an inner peripheral surface of the tubular body.

In the invention, as the friction member, the following one is suitable. The sliding layer formed of polyimide resin, tetrafluoroethylene resin, or a mixture thereof is formed on one surface of a metal sheet (mesh-like metal sheet) formed of an expanded metal or metal wire net having a multiplicity of meshes, in such a manner as to fill the meshes of the metal sheet, as described above. The metal sheet having such a sliding layer formed on one surface thereof is cut into strips. This metal sheet in the form of strip is convoluted by one turn such that the sliding layer is set on the inner peripheral surface side, thereby forming a hollow cylinder having a slit formed between mutual abutment ends of the metal sheet and extending from one end face to the other. Subsequently, this hollow cylinder is subjected to press forming, thereby fabricating the friction member which integrally has the hollow cylindrical portion and the collar.

The friction damper according to a 16th aspect of the invention, in the friction damper according to any one of the first to 15th aspects, further comprises at least one displaceable member interposed between the support and the hollow cylindrical portion of the friction member.

In the invention, if the displaceable member is provided as in the friction damper according to the 16th aspect, the hollow cylindrical portion of the friction member can be uniformly brought into contact with the rod.

The displaceable member preferably has a slit and is thereby reducible in diameter as in the friction damper according to a 17th aspect, or the displaceable member is formed into two-split members and is thereby reducible in diameter as in the friction damper according to an 18th aspect.

As in the friction damper according to a 19th aspect of the invention, the displaceable member is sufficient if it is formed of one of a rubber plate, a copper plate, and an embossed plate, which is capable of uniformly bringing the hollow cylindrical portion of the friction member into contact with the rod by virtue of its deformability, particularly in the tightening of the hollow cylindrical portion of the friction member against the rod by the tightening means.

As for the displaceable member, a single displaceable member may be interposed between the support and the hollow cylindrical portion of the friction member. Alternatively, however, as in the friction damper according to a 20th aspect of the invention, a plurality of displaceable members may be superposed one on top of another, and may be interposed between the support and the hollow cylindrical portion of the friction member.

As in the friction damper according to a 21st aspect of the invention, the rod is preferably formed of a solid or hollow member having a cylindrical surface on an outer peripheral surface thereof.

In accordance with the invention, it is possible to provide a friction damper which has a simple structure, is capable of reducing wear and the exfoliation of the sliding layer as practically as possible, and makes it possible to obtain stable damping characteristics over a long period of time.

Hereafter, a more detailed description will be given of the mode for carrying out the invention on the basis of the preferred embodiments illustrated in the drawings. It should be noted that the invention is not limited to these embodiments.

BRIEF DESCRIPTION OF THE DRAWINGS

FIG. 14 is a perspective view of the friction member and the displaceable member shown in FIG. 13.

EMBODIMENTS

Figure 1:
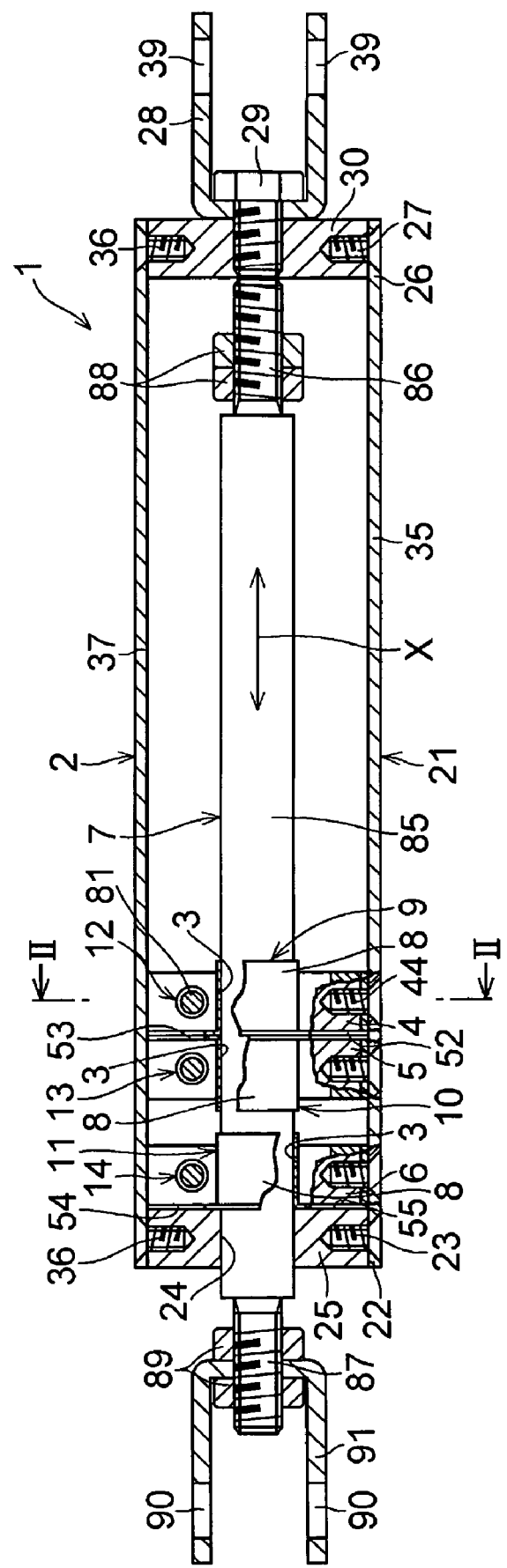
FIG. 1 is a front cross-sectional view of a preferred embodiment of the invention.

In FIGS. 1 to 5, a friction damper 1 in accordance with this embodiment is comprised of a base body 2; a plurality of, or in this embodiment three, supports 4, 5, and 6 which are respectively secured to an elongated member 35 of the base body 2, have a through hole 3, and are arranged in an axial direction X; a rod 7 which extends in such a manner as to pass through the respective through holes 3 of the supports 4, 5, and 6, and is movable in the axial direction X with respect to the supports 4, 5, and 6; friction members 9, 10, and 11 each of which has a hollow cylindrical portion 8 interposed between each of the supports 4, 5, and 6 and a cylindrical main body portion 85 of the rod 7 in a corresponding through hole 3 of the support 4, 5, or 6, the frictions members 9, 10, and 11 being fixed immovably with respect to the relative movement of the rod 7 in the axial direction X with respect to the base body 2 and being provided with respect to the respective supports 4, 5, and 6; and tightening means 12, 13, and 14 provided for the supports 4, 5, and 6 so as to tighten the respective hollow cylindrical portions 8 of the friction members 9, 10, and 11 onto the main body portion 85 of the rod 7.

Figure 7:
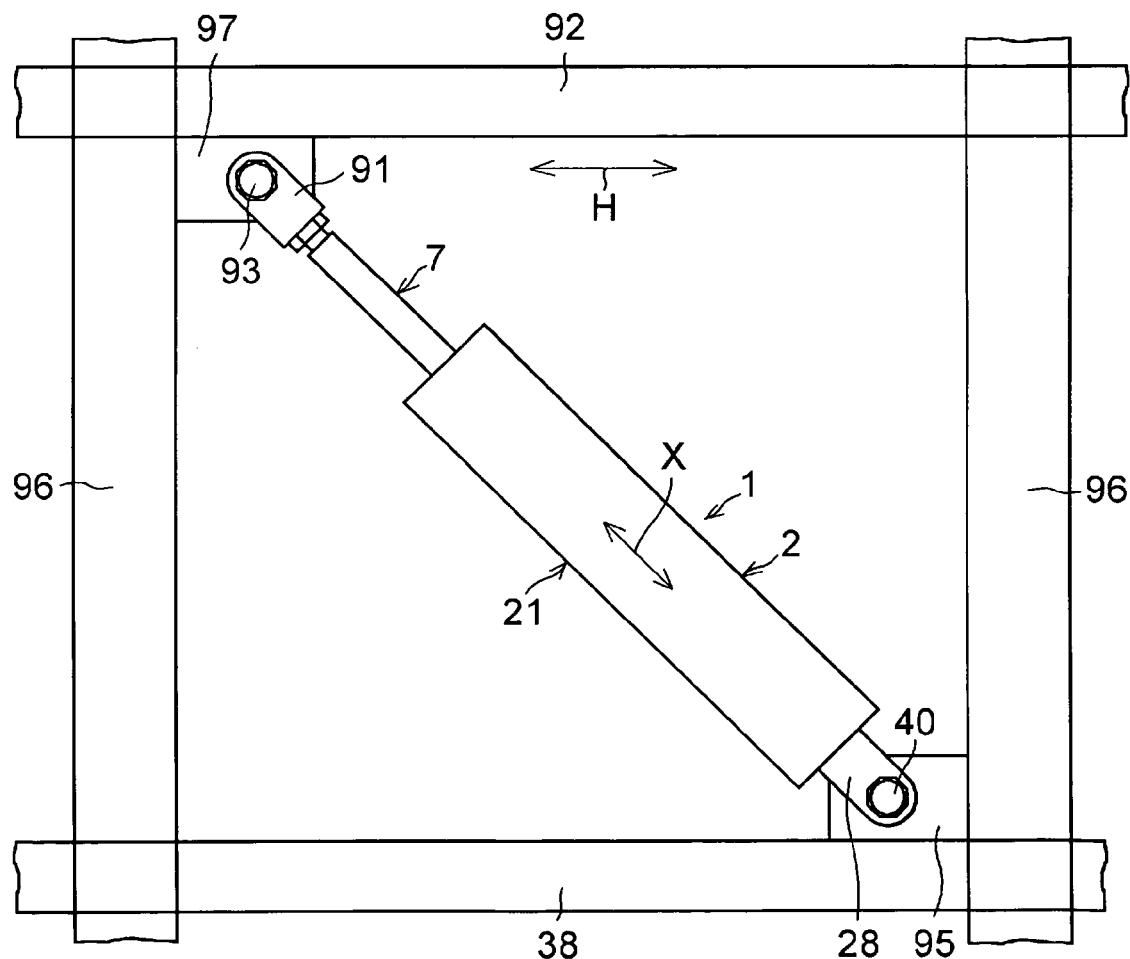
FIG. 7 is an explanatory diagram of an example in which the embodiment shown in FIG. 1 is used in a detached house.

The base body 2 includes a rectangular tubular body 21 extending in the axial direction X; one cover 25 secured to an inner surface of one end portion 22 of the tubular body 21 by means of screws 23 and having a through hole 24 through which the main body portion 85 of the rod 7 is passed through; and another cover 30 secured to an inner surface of the other end portion 26 of the tubular body 21 by means of screws 27 and having a U-shaped fitting 28 attached thereto by a bolt 29. The tubular body 21 has the elongated member 35 with a U-shaped cross section, as well as a plate member 37 attached to the cover 25 and the cover 30 at both ends by means of screws 36 so as to close opening planes of the elongated member 35. The fitting 28 for attaching the base body 2 to one of the pair of members which are displaced relative to each other, e.g., a lower beam 38 of a detached house as the structure, as shown in FIG. 7, has a pair of through holes 39 for the insertion of a shaft member.

The base body 2 is so arranged as to be capable of being rotatably attached to the lower beam 38 by means of a shaft member 40 which is inserted in the through holes 39 of the fitting 28 secured to the cover 30.

Since the supports 4, 5, and 6 are respectively formed in a mutually similar manner, a detailed description will be given below of the support 4, and the supports 5 and 6 will be described, as required.

Figure 3:
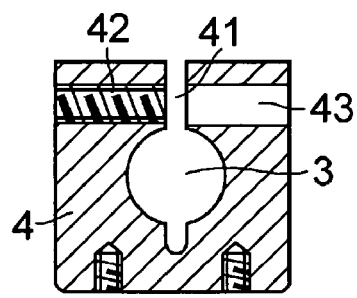
FIG. 3 is an explanatory diagram of a support in accordance with the embodiment shown in FIG. 1.

As particularly shown in FIG. 3, in addition to the through hole 3, the support 4 shaped substantially in the form of a rectangular parallelepiped has a slit 41 communicating with the through hole 3 so that the diameter of the through hole 3 can be reducible. Further, the support 4 has an internally threaded hole 42 and a bolt insertion hole 43 disposed in face-to-face relation to the internally threaded hole 42 in alignment therewith. The support 4 is secured to the inner peripheral surface of the elongated member 35 by means of screws 44.

Since the friction members 9, 10, and 11 are respectively formed in a mutually similar manner, a detailed description will be given below of the friction member 9, and the friction members 10 and 11 will be described, as required.

Figure 4:
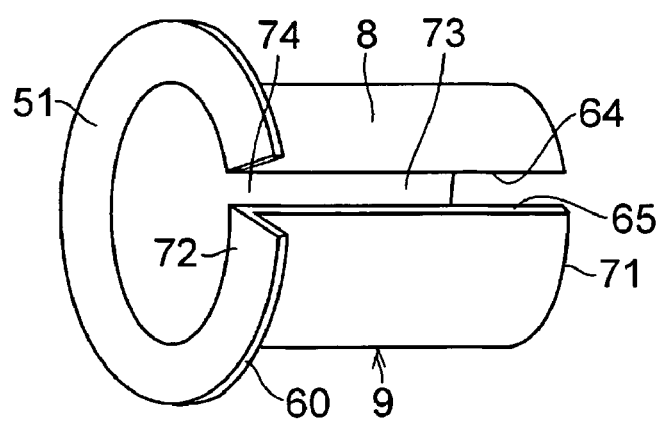
FIG. 4 is a perspective view of a friction member in accordance with the embodiment shown in FIG. 1.
Figure 5:
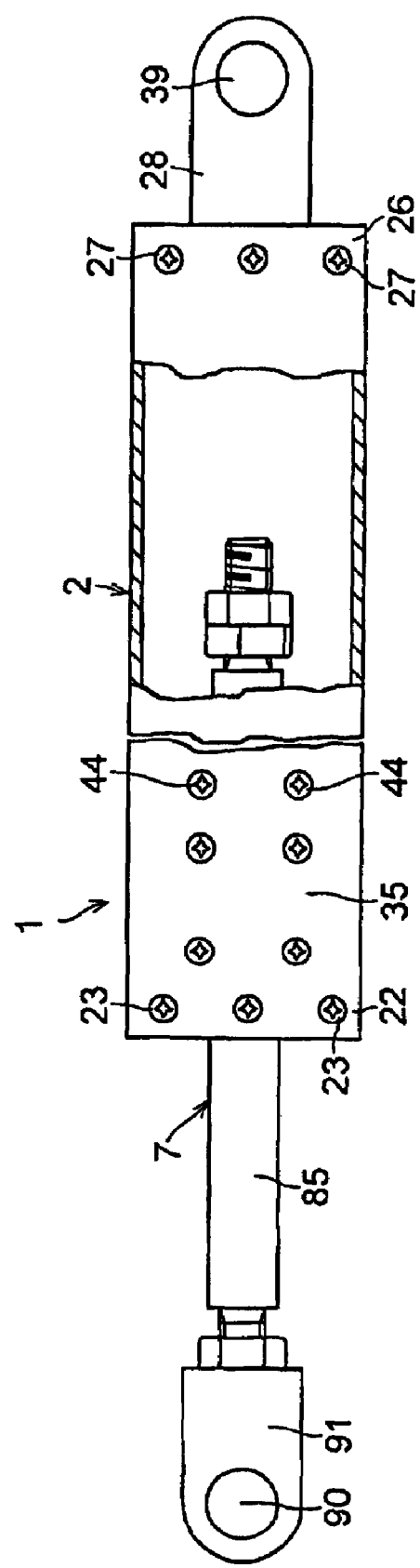
FIG. 5 is a partially cutaway bottom view of the embodiment shown in FIG. 1.

As particularly shown in FIG. 4, in addition to the hollow cylindrical portion, the friction member 9 has a collar 51 formed integrally with the hollow cylindrical portion 8. The collar 51 of the friction member 9 is superposed on the collar 51 of the friction member 10 having the hollow cylindrical portion 8 interposed between the support 5 and the main body portion 85 of the rod 7 in the through hole 3 of the adjacent support 5. The collar 51 is disposed between mutually opposing side surfaces 52 and 53 of the supports 4 and 5 by being clamped by the side surfaces 52 and 53. Thus, the friction member 9 is fixed immovably with respect to the relative movement of the rod 7 in the axial direction X with respect to the base body 2 at the collar 51.

It should be noted that the friction member 11, which has the hollow cylindrical portion 8 interposed between the support 6 and the main body portion 85 of the rod 7 in the through hole 3 of the support 6, is fixed immovably with respect to the relative movement of the rod 7 in the axial direction X with respect to the base body 2 at the collar 51 disposed between mutually opposing side surfaces 54 and 55 of the support 6 and the cover 25 adjacent to the support 6 by being clamped by the side surfaces 54 and 55.

Figure 6:
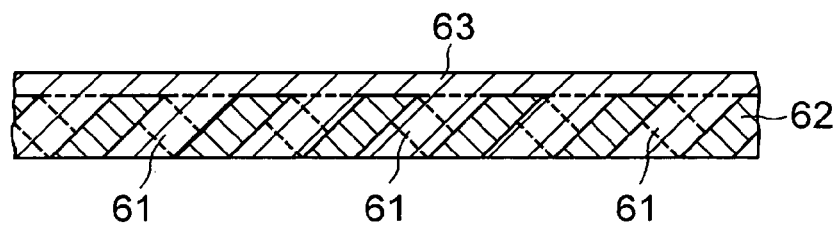
FIG. 6 is an explanatory diagram of the friction member in accordance with the embodiment shown in FIG. 1.

The friction member 9 is fabricated as follows. As shown in FIG. 6, a sliding layer 63 formed of polyimide resin, tetrafluoroethylene resin, or a mixture thereof is first formed on one surface of a metal sheet (mesh-like metal sheet) formed of an expanded metal or metal wire net 62 having a multiplicity of meshes 61, in such a manner as to fill the meshes 61 of the metal sheet. The metal sheet having such a sliding layer 63 formed on one surface thereof is cut into strips. This metal sheet in the form of strip is convoluted by one turn such that the sliding layer 63 is set on the inner peripheral surface side, thereby forming a hollow cylinder having a slit formed between mutual abutment ends 64 and 65 of the metal sheet and extending from one end face to the other. Subsequently, by subjecting this hollow cylinder to press forming, the friction member 9 is fabricated which includes the hollow cylindrical portion 8 having the expanded metal or metal wire net 62 as a mesh-like base material disposed on the radially outer peripheral surface side and the synthetic resin-made sliding layer 63, which fills the meshes 61 of the expanded metal or metal wire net 62 serving as the mesh-like base material, is formed on one surface of the expanded metal or metal wire net 62, and is disposed on the radially inner peripheral surface side, as well as the collar 51 formed integrally with the hollow cylindrical portion 8.

The hollow cylindrical portion 8 of the friction member 9 thus fabricated has a slit 73 extending from one end face 71 to the other end face 72 in the axial direction X, and is hence capable of undergoing a reduction in diameter. The collar 51 of the friction member 9 also has a slit 74 extending radially in such a manner as to continue from the slit 73. The hollow cylindrical portion 8 is thereby made reducible in diameter.

In the friction member 9, the sliding layer 63 containing at least one of polyimide resin and tetrafluoroethylene resin is disposed on the radially inner peripheral surface side of the hollow cylindrical portion 8 so as to be brought into contact with the main body portion 85 of the rod 7 slidably in its axial direction X.

Since the tightening members 12, 13, and 14 are also respectively formed in a mutually similar manner, a detailed description will be given below of the tightening member 12, and the tightening members 13 and 14 will be described, as required.

The tightening member 12 has a bolt 81 which is inserted into the support 5 through the bolt insertion hole 43 and is threadedly engaged with the internally threaded hole 42 of the support 5, so as to be capable of reducing the width of the slit 41. The arrangement provided is such that as the state of threaded engagement with the internally threaded hole 42 is changed by turning the bolt 81, the width of the slit 41 is reduced to reduce the diameter of the through hole 3 of the support 5, and the hollow cylindrical portion 8 of the friction member 9 is caused to undergo a reduction in diameter through this reduction in diameter, to thereby tighten the hollow cylindrical portion 8 against the main body portion 85 of the rod 7.

The rod 7 has the cylindrical main body portion 85 and threaded portions 86 and 87 respectively formed integrally at opposite ends, as viewed in the axial direction X, of the main body portion 85. A detent nut 88 is threadedly engaged with the threaded portion 86, while a U-shaped fitting 91 having through holes 90 for the insertion of a shaft member is fixed to the threaded portion 87 by means of a nut 89 threadedly engaged with the threaded portion 87.

The rod 7 is made capable of being rotatably attached to the other one of the pair of members which are displaced relative to each other, e.g., an upper beam 92 of a detached house as the structure, as shown in FIG. 7, by the threaded portion 87 by means of a shaft member 93 inserted in the through holes 90 of the fitting 91.

As shown in FIG. 7, the above-described friction damper 1 is used such that the base body 2 is rotatably attached to the lower beam 38 extending between columns 96 by means of the fitting 28, the shaft member 40, and an attaching plate 95, while the rod 7 is rotatably attached to the upper beam 92 extending between the columns 96 by means of the fitting 91, the shaft member 93, and an attaching plate 97.

When the upper beam 92 is displaced in a lateral direction H relative to the lower beam 38 due to an earthquake, the rod 7 moves in the axial direction X relative to the base body 2. In the relative movement of the rod 7 in the axial direction X with respect to the base body 2, such relative movement energy, e.g., the relative displacement energy of the upper beam 92 in the lateral direction H with respect to the lower beam 38, is absorbed by the friction between the hollow cylindrical portion 8 of the friction member 9 and the main body portion 85 of the rod 7. Thus, the relative displacement of the upper beam 92 in the lateral direction H with respect to the lower beam 38 is damped at an early period.

According to the friction damper 1, the base material of the friction member 9 is the mesh-like material comprising the expanded metal or metal wire net 62; the sliding layer 63 of the friction member 9 is formed on one surface of the expanded metal or metal wire net 62 in such a manner as to fill the meshes of the expanded metal or metal wire net 62; and such a sliding layer 63 is disposed on the radially inner peripheral surface side of the hollow cylindrical portion 8 so as to be brought into contact with the rod 7 slidably in its axial direction X. Therefore, it is possible to avoid wear with respect to the main body portion 85 of the rod 7 as practically as possible, and obtain desired stable friction between the main body portion 85 and the hollow cylindrical portion 8. Furthermore, it is possible to avoid the exfoliation of the sliding layer 63. Hence, it is possible to obtain stable damping characteristics over a long period of time.

In addition, according to the friction damper 1, the hollow cylindrical portion 8 of the friction member 9 can be tightened onto the main body portion 85 of the rod 7 by the tightening means 12 by being optimally adjusted. Therefore, by a simple operation, optimal frictional resistance can be obtained for the upper beam 92 and the lower beam 38 which undergo relative displacement in the lateral direction H.

In addition, according to the friction damper 1, the displacement energy is adapted to be absorbed by the three friction members 9, 10, and 11. Therefore, as a result of the fact that the respective loads of the friction members 9, 10, and 11 can be reduced, it is possible to obtain stable damping characteristics over a long period of time.

Furthermore, according to the friction damper 1, the respective friction members 9, 10, and 11 are fixed immovably with respect to the relative movement of the rod 7 in the axial direction X with respect to the base body 2 by being clamped by the supports 4 and 5 adjoining at the collars 51 and by the support 6 and the cover 25. Therefore, the respective friction members 9, 10, and 11 can be firmly fixed, so that it is possible to eliminate the drawback that the friction members 9, 10, and 11 are offset from the supports 4, 5, and 6.

Figure 8:
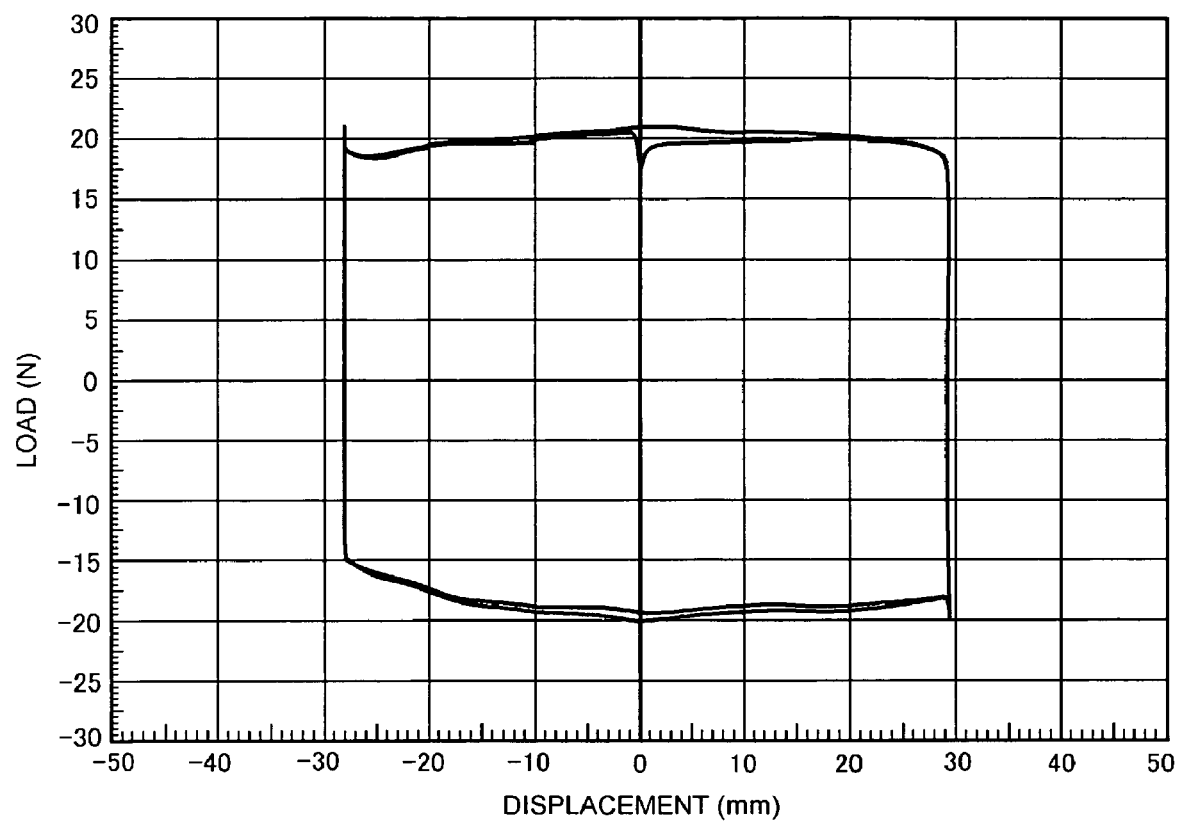
FIG. 8 is a load-displacement characteristic diagram in accordance with the embodiment shown in FIG. 1.

The friction damper 1, in which the diameter of the main body portion 85 of the rod 7 was 12 mm and the frictional force of the sliding layer 63 of each of the friction members 9, 10, and 11 was 200 N, was fabricated. In such a friction damper 1, the rod 7 was subjected to relative displacement of about ±30 mm in the axial direction X with respect to the base body 2 at 0.05 Hz, which was repeated three times, to measure the load-displacement characteristic. The result is shown in FIG. 8.

Figure 9:
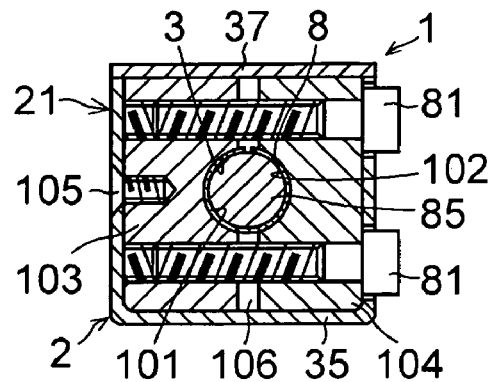
FIG. 9 is an explanatory cross-sectional view using another example of the support in the embodiment shown in FIG. 1.
Figure 10:
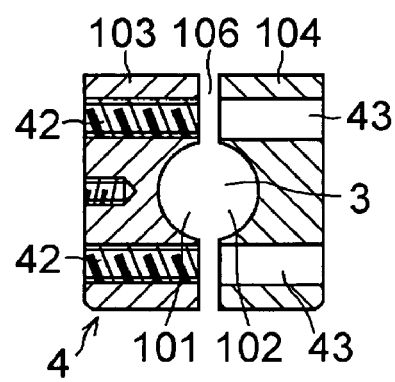
FIG. 10 is an explanatory cross-sectional view of the other example of the support shown in FIG. 9.

It should be noted that although the aforementioned support 4 is integrally formed by being provided with the through hole 3 and the slit 41, as shown in FIGS. 9 and 10, the support 4 may alternatively be formed by two-split members 103 and 104 respectively having semicircular holes 101 and 102 for forming the through hole 3, thereby rendering the through hole 3 reducible in diameter by the two-split members 103 and 104. In the support 4 formed by the two-split members 103 and 104 shown in FIGS. 9 and 10, one split member 103 is secured to the elongated member 35 of the base body 2 by a screw 105, while the other split member 104 is disposed movably in the tubular body 21 such that the semicircular hole 102 opposes the semicircular hole 101. The tightening means 12 for such a support 4 has two bolts 81 which are inserted in the split member 104 of the support 4 through the two bolt insertion holes 43 in the split member 104, and are respectively threadedly engaged with the two internally threaded holes 42 in the split member 103 of the support 4 so as to be able to reduce the width of a gap 106 between the two split members 103 and 104.

The friction damper 1 having the support 4 shown in FIGS. 9 and 10 is also capable of exhibiting advantages similar to those described above.

Figure 11:
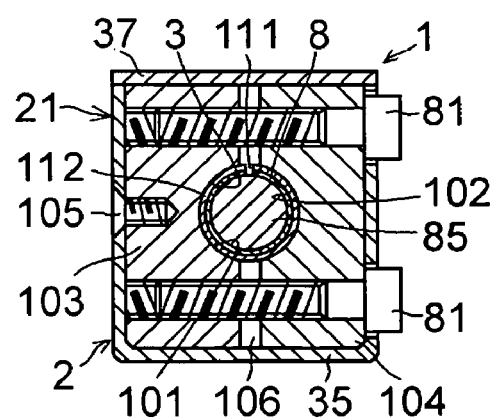
FIG. 11 is a cross-sectional view of another preferred embodiment of the invention.
Figure 12:
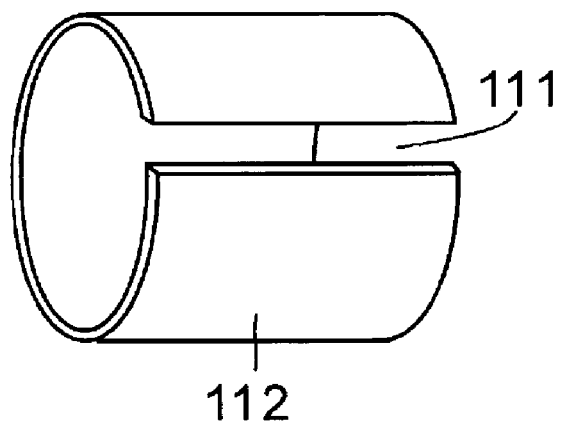
FIG. 12 is a perspective view of the displaceable member shown in FIG. 11.

With the above-described friction damper 1, although the hollow cylindrical portion 8 is tightened against the main body portion 85 of the rod 7 by causing the support 4 to come into direct contact with the hollow cylindrical portion 8 of the friction member 9, an arrangement may alternatively be provided such that, as shown in FIGS. 11 and 12, a hollow cylindrical displaceable member 112, which has a slit 111 to be reducible in diameter and is formed of a rubber plate, a copper plate, or an embossed plate, is interposed between the two-split members 103 and 104 of the support 4 and the hollow cylindrical portion 8 of the friction member 9, and the tightening of the hollow cylindrical portion 8 against the main body portion 85 by the tightening means 12 by means of the support 4 is further effected by means of the displaceable member 112. As the displaceable member 112, which is formed of a rubber plate, a copper plate, or an embossed plate and elastically permits a slight deformation in the radial direction, specifically a slight change in the thickness in the radial direction, is interposed between the support 4 and the hollow cylindrical portion 8 of the friction member 9, it is possible to cope with a creep deformation of the friction member 9 and the like through the elastic deformation of the displaceable member 112. As a result, the hollow cylindrical portion 8 can be uniformly pressed and abutted against the main body portion 85, thereby making it possible to obtain appropriate frictional resistance as a whole.

In the embodiment shown in FIGS. 11 and 12, although a single displaceable member 112 is interposed between the support 4 and the hollow cylindrical portion 8, a plurality of displaceable members 112 may be superposed one on top of another, and the plurality of such displaceable members 112 may be interposed between the support 4 and the hollow cylindrical portion 8.

Figure 13:
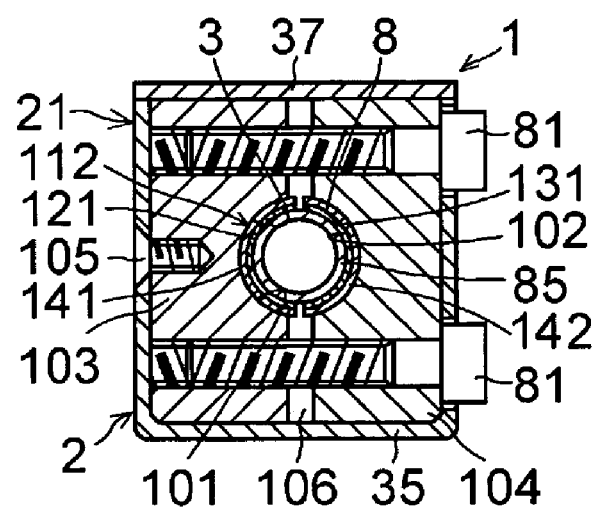
FIG. 13 is a cross-sectional view of still another preferred embodiment of the invention.

In addition, although the above-described friction member 9 has the hollow cylindrical portion 8 and the collar 51, is reducible in diameter by means of the slit 73, and is integrally formed, the friction member 9 may alternatively be formed as follows. Namely, as shown in FIGS. 13 and 14, the friction member 9 may be formed by being provided with a split member 123 consisting of a hollow semicylindrical portion 121 and a half collar 122 formed integrally with the hollow semicylindrical portion 121 as well as a split member 133 consisting of a hollow semicylindrical portion 131 and a half collar 132 formed integrally with the hollow semicylindrical portion 131. The hollow cylindrical portion 8 formed by the hollow semicylindrical portion 121 and the hollow semicylindrical portion 131 may be formed into such two-split members 123 and 133, so as to be made reducible in diameter.

As shown in FIGS. 13 and 14, the displaceable member 112 may also be formed by two-split members 141 and 142 so as to be reducible in diameter by means of the two-split members 141 and 142. The split member 141 is interposed between the split member 103 and the hollow semicylindrical portion 121, while the split member 142 is interposed between the split member 104 and the hollow semicylindrical portion 131.

Figure 2:
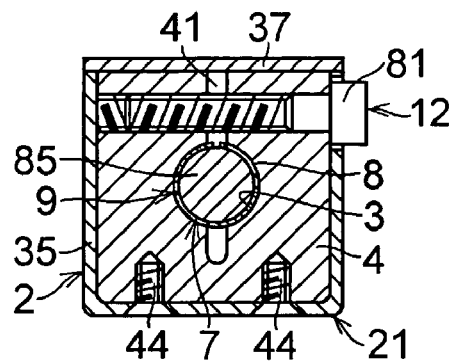
FIG. 2 is a cross-sectional view, taken in the direction of arrows II-II, of the embodiment shown in FIG. 1.

In addition, as shown in FIGS. 2 and 9, among others, the main body portion 85 of the rod 7 may be formed of a solid member having a cylindrical surface on its outer peripheral surface. Alternatively, however, the main body portion 85 of the rod 7 may be formed of a hollow member, i.e., a tubular member, as shown in FIG. 13.

The invention claimed is:

1. A friction damper comprising:
a base body adapted to be capable of being attached to one of a pair of members which are displaced relative to each other;
first and second supports each secured to said base body and having a through hole, said first support having only one slit communicating with said through hole of said first support so that the diameter of said through hole of said first support can be reducible, said first and second supports being mutually adjacent in an axial direction;
a rod which extends through the through hole of said first and second supports, is movable in the axial direction with respect to said first and second supports, and is adapted to be capable of being attached to another one of the pair of members; and
a friction member which has a hollow cylindrical portion interposed between said first support and said rod in the through hole of said first support, and only one collar united with said hollow cylindrical portion,
said first and second supports between which said collar is disposed, clamping said collar so as to fix said friction member immovably with respect to relative movement of said rod in the axial direction with respect to said base body,
said hollow cylindrical portion of said friction member having only one slit extending from one end face to another end face thereof in the axial direction so that the diameter of said hollow cylindrical portion can be reducible, and
said hollow cylindrical portion of said friction member further having a mesh base material disposed on a radially outer peripheral surface side thereof and a synthetic resin-made sliding layer filling meshes of said base material and formed on one surface of said base material,
said hollow cylindrical portion of said friction member covering a surface defining the through hole of said first support from one axial end of said first support, at a position of which said collar is united with said hollow cylindrical portion, over another axial end of said first support, said sliding layer being disposed on radially inner peripheral surface side of said hollow cylindrical portion so as to be brought into contact with said rod slidably in the axial direction.

2. The friction damper according to claim 1, further comprising:

tightening means for tightening said hollow cylindrical portion of said friction member against said rod, the through hole of said support and said hollow cylindrical portion of said friction member being reducible in diameter, said tightening means being adapted to reduce the diameter of said hollow cylindrical portion of said friction member through the reduction in diameter of the through hole of said support to tighten said hollow cylindrical portion against said rod.

3. The friction damper according to claim 2, wherein said tightening means has a bolt threadedly engaged with said support, so as to be able to reduce the width of the slit.

4. The friction damper according to claim 2, wherein a said tightening means and said friction member are provided for each of said first and second supports.

5. The friction damper according to claim 1, wherein said base material comprises one of an expanded metal and a metal wire net.

6. The friction damper according to claim 1, wherein said sliding layer contains polyimide resin.

7. The friction damper according to claim 1, wherein said sliding layer contains tetrafluoroethylene resin.

8. The friction damper according to claim 1, wherein said base body includes a tubular body; one cover secured to one end portion of said tubular body and having a through hole through which said rod is passed through; and another cover secured to another end portion of said tubular body and having a fitting attached thereto for being attached to the one member, said first and second supports being secured to an inner peripheral surface of said tubular body.

9. The friction damper according to claim 1, wherein said rod is formed of a solid or hollow member having a cylindrical surface on an outer peripheral surface thereof.

* * * * *

UNITED STATES PATENT AND TRADEMARK OFFICE
CERTIFICATE OF CORRECTION

PATENT NO. : 7,322,451 B2  Page 1 of 1
APPLICATION NO. : 10/501473
DATED : January 29, 2008
INVENTOR(S) : Okimura et al.

It is certified that error appears in the above-identified patent and that said Letters Patent is hereby corrected as shown below:

On the Title Page Item (75) "Inventors" the inventors should be listed as:

Akihiko Okimura, Ashikaga (JP)

Kazuhiro Nagashima, Ashikaga (JP)

Go Tanaka, Ashikaga (JP)

Yoshikazu Arai, Zushi (JP) (Deceased)

Youko Arai, Zushi (JP), Legal Representative of Yoshikazu Arai.

Signed and Sealed this

Eleventh Day of November, 2008

JON W. DUDAS
*Director of the United States Patent and Trademark Office*